US008955807B2

(12) United States Patent
Alexander et al.

(10) Patent No.: US 8,955,807 B2
(45) Date of Patent: Feb. 17, 2015

(54) SECURITY BRACKET

(75) Inventors: Chris Alexander, Hillsboro, OR (US); Eric Pitt, Hillsboro, OR (US); Wade Wheeler, Hillsboro, OR (US)

(73) Assignee: Mobile Tech, Inc., Lake Oswego, OR (US)

( * ) Notice: Subject to any disclaimer, the term of this patent is extended or adjusted under 35 U.S.C. 154(b) by 339 days.

(21) Appl. No.: 12/858,651

(22) Filed: Aug. 18, 2010

(65) Prior Publication Data

US 2012/0043451 A1 Feb. 23, 2012

(51) Int. Cl.
*F16M 11/04* (2006.01)
*A47F 7/024* (2006.01)
*G03B 17/56* (2006.01)

(52) U.S. Cl.
CPC .............. *A47F 7/024* (2013.01); *G03B 17/568* (2013.01); *G03B 17/561* (2013.01)
USPC ......... 248/187.1; 248/310; 248/551; 396/428

(58) Field of Classification Search
USPC ......... 248/551, 552, 553, 187.1, 310, 346.03; 396/428
See application file for complete search history.

(56) References Cited

U.S. PATENT DOCUMENTS

| 3,612,462 | A  | * | 10/1971 | Mooney et al. | 248/316.4 |
| 4,771,273 | A  | * | 9/1988  | Test et al. | 340/693.11 |
| 6,592,088 | B2 | * | 7/2003  | Thompson | 248/220.1 |
| 6,773,172 | B1 | * | 8/2004  | Johnson et al. | 396/428 |
| 6,885,817 | B2 | * | 4/2005  | Artonne et al. | 396/20 |
| 7,085,491 | B2 | * | 8/2006  | Chiang | 396/432 |
| 7,883,279 | B2 | * | 2/2011  | Kendall | 396/428 |
| 8,191,851 | B2 | * | 6/2012  | Crown | 248/553 |
| 2003/0128975 | A1 | * | 7/2003 | Shevick | 396/428 |
| 2009/0166483 | A1 | * | 7/2009 | Marsilio et al. | 248/187.1 |
| 2009/0179127 | A1 | * | 7/2009 | Pettey | 248/276.1 |
| 2010/0215355 | A1 | * | 8/2010 | Olien | 396/428 |
| 2011/0309934 | A1 | * | 12/2011 | Henson et al. | 340/568.2 |
| 2012/0037783 | A1 | * | 2/2012 | Alexander et al. | 248/551 |

* cited by examiner

*Primary Examiner* — Gwendolyn Baxter
(74) *Attorney, Agent, or Firm* — Bruce A. Kaser

(57) ABSTRACT

The invention is a security bracket assembly for preventing theft of camera lenses from cameras that are on display at retail locations. The bracket assembly carries and partially receives the camera body. The assembly has a forward shield that prevents finger access to the lens release mechanism that allows detachment of the lens from the camera body. The forward shield may be removed from the assembly so that a camera lens can be swapped without disconnecting other security or power features associated with the camera display post.

2 Claims, 5 Drawing Sheets

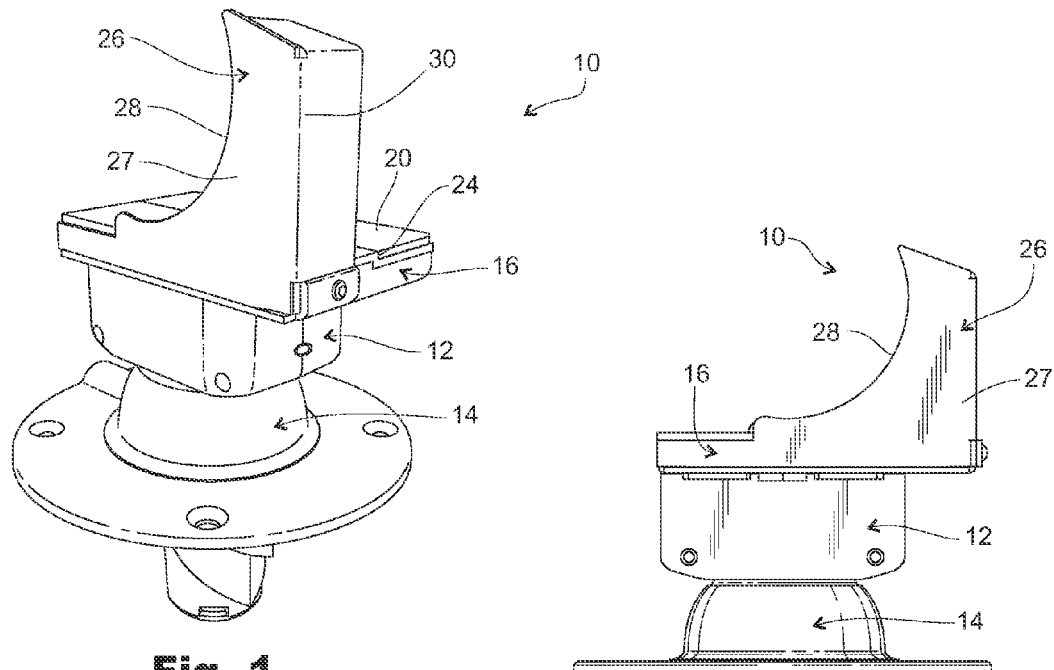
Fig. 1
Fig. 2
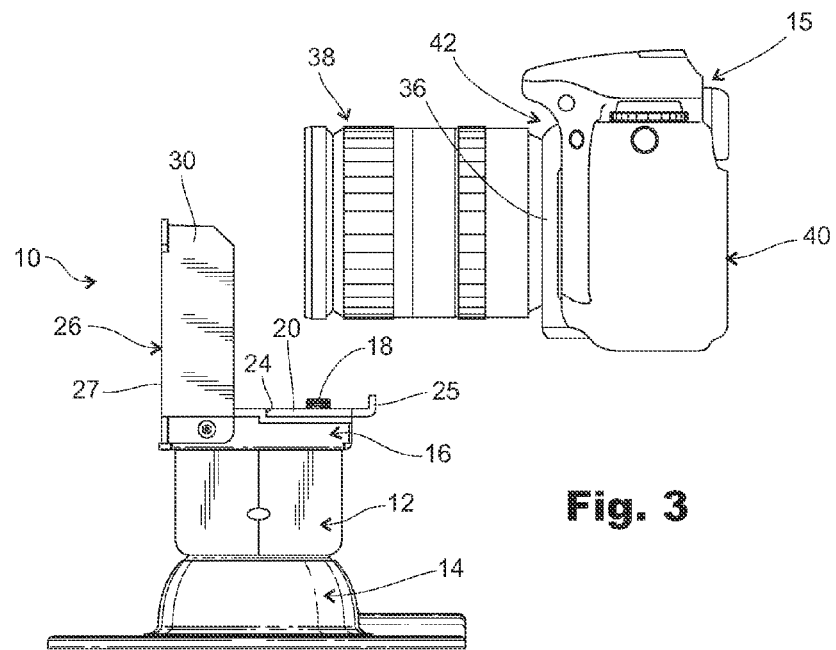
Fig. 3

SECURITY BRACKET

TECHNICAL FIELD

The invention disclosed here generally relates to retail security displays where large numbers of hand-held electronic devices (cell phones, PDAs, cameras, etc.) are offered for sale to the public via countertop display posts. More specifically, the invention relates to mounting bracket designs that are used on individual display posts.

SUMMARY OF THE INVENTION

The invention disclosed here is an improvement for a mounting member (commonly called a "puck") that is used to display hand-held devices in a retail location. Pucks are often times located at each one of a plurality of post positions on a display countertop surface. The hand-held is mounted to the puck and then the puck, and hand-held, are lifted together from the display surface by a consumer who wishes to examine the product.

The present invention is specific to puck-mounted cameras having a removable lens. Under normal circumstances, different types of security sensors are used in conjunction with the typical mounting puck. For example, it is common to use a pressure-activated security button at the physical interface where the body of the hand-held is pulled against a top surface of the puck by a mounting screw or similar type of attachment means.

The use of "secondary" sensor cables is also common in the security industry. A secondary sensor cable creates a separate security circuit by applying a pressure-activated sensor switch somewhere to the outer surface of the body of the hand-held. In this case, the sensor switch is at the end of a short cable (interconnecting the sensor and puck). The sensor switch is connected to the hand-held's body by an adhesive substance (typically) that bonds the switch to the hand-held. Sometimes, secondary sensors are secured to hand-helds by small straps that look like cable ties.

It is difficult to use conventional security sensors on a removable camera lens. Digital single lens reflex ("DSLR") cameras, by theft nature, have lens surfaces that are not amenable to or compatible for use with the conventional kinds of security sensors used in the typical post display. A typical DSLR is cylindrical in shape and lacks a sufficiently large, flat, and non-rotating surface for the attachment of a typical secondary security sensor switch, for example. Similarly, it is undesirable to use a cable-tie strap that tightly surrounds the lens because, among other things, it interferes with hand-operation of the lens by a potential purchaser.

All of the above creates potential theft problems with those retailers who are offering large numbers of DSLR cameras for sale with high quality removable lenses. Because it is hard to attach a security sensor to the lens, it is possible for a thief to detach a lens from the camera without otherwise triggering any alarms at the post position. The thief can just pocket the lens and walk away.

While there are variations between camera makes and models, most cameras have quick-release mounts that require finger access to either unscrew the lens from the mount or press a push-button release. In order to address the theft problem unique to DSLR camera lenses, which can be significant for "big-box" retailers, the present invention is an improvement that is designed to be used in conjunction with typical display pucks.

As just indicated, the typical camera with a removable lens will have a release button or similar type of release mechanism near the lens and camera body interface. Pressing the release mechanism enables disengagement of the lens from the camera body.

The present invention is a security bracket assembly that partially armors the camera body and lens from the consumer. The security bracket assembly has a base portion that captures the lower part of the camera body. The base portion provides the same general type of screw attachment as conventional puck-mounted attachment arrangements, although with greater flexibility.

The security bracket assembly also includes a forward or frontal bracket portion. The forward bracket portion has both a frontal surface that is spaced forwardly of the front side of the camera body and a side shield that is shaped to cover the region or space where the camera release mechanism is typically located, in a manner so that a potential thief cannot physically access the release mechanism or base of the lens.

The frontal surface of the security bracket assembly is curved so that it generally follows the outer curvature of a typical cylindrically-shaped DSLR. The frontal and side shield parts make up an integrally molded, forward bracket component part of the overall assembly. This part of the assembly is detachably mounted to the base portion of the assembly, in a manner so that it can be removed by a salesperson or other authorized party, but without actually removing the camera from the puck or disconnecting and reconnecting any security sensors (secondary security cables or otherwise).

The advantages offered by the invention are two-fold. First, there are times when a salesperson may want to remove and replace lenses on the same camera. This might happen if a prospective purchaser wants to inspect the existing mount or the ease of swapping lenses. The detachable forward bracket part of the security bracket assembly allows immediate hand-access to the lens for swapping lenses without otherwise needing to disconnect and reconnect any security or power cables.

Second, not all camera lenses have the same length or diameter. Having a removable forward security bracket component allows the swapping of bracket parts that have different shapes and curvatures, as needed, to adapt to different camera models or release mechanisms. The design also makes it possible for security vendors to sell the removable forward part as a "kit" of replaceable brackets, thus giving the retailer the option of selecting the needed size and shape as product displays change.

The invention as summarized above will become more clearly understood upon consideration of the description that follows.

BRIEF DESCRIPTION OF THE DRAWINGS

In the drawings, like reference numerals refer to like parts throughout the various views, and wherein;

FIG. 1 is a pictorial view of a display post showing a security bracket assembly constructed in accordance with a preferred embodiment of the invention;

FIG. 2 is a frontal view of the post and security bracket assembly shown in FIG. 1;

FIG. 3 is a side view of the post and security bracket assembly shown in FIGS. 1-2, showing a camera about to be mounted to the bracket;

BEST MODE FOR CARRYING OUT THE INVENTION

Figure 4:
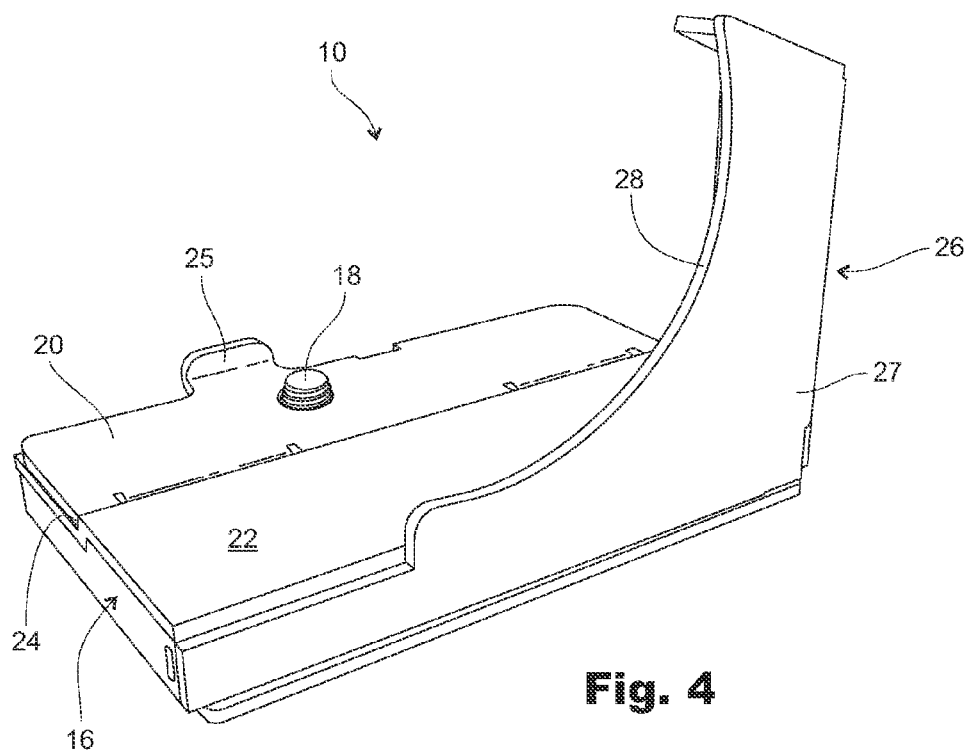
FIG. 4 is a perspective view of the security bracket assembly.

Referring now to the drawings, and first to FIG. 1, shown generally at 10 is a security bracket assembly constructed in accordance with a preferred embodiment of the invention. The security bracket assembly 10 is shown connected to a mounting member or puck 12. The puck 12 normally rests on a base piece 14 that is mounted to a countertop or the like (not shown). A person skilled in the art would understand that the puck 12 is lifted and replaced to and from the base 14 when a hand-held device is examined by a consumer. FIG. 3 shows a camera 15 (DSLR) about to be attached to the bracket assembly 10. It is also possible to first connect the security bracket assembly 12 to the camera 15 and then mount camera and bracket to the puck 12.

The improvement described here relates only to the security bracket assembly 10. Shifting attention to FIG. 5, the security bracket assembly 10 has a rectangular base portion, indicated generally at 16. A screw 18 positioned within the base 16 allows the bracket assembly 10 to be attached to the camera 15.

Some cameras may have different footprints. Therefore, the base portion 16 has an adaptor piece 20 that may be added or removed to the base portion 16, as needed. When it is added, it creates a smooth top surface 22 (see FIG. 4) from front-to-back. When removed, it creates a slight "step" (see reference numeral 24 in the back portion of security assembly base portion 16), for adapting the security bracket 10 to a different camera footprint. As is best seen in FIGS. 3-5, when installed, the adaptor piece 20 includes a rearward retaining tab 25 that rests against the lower, rear edge of the camera body.

Figure 7:
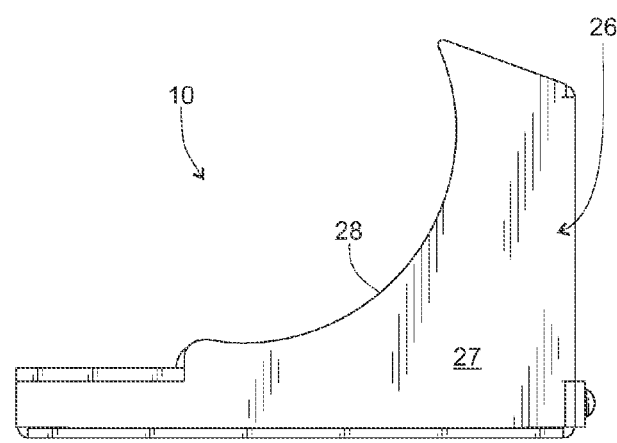
FIG. 7 is a frontal view of the security bracket assembly.
Figure 8:
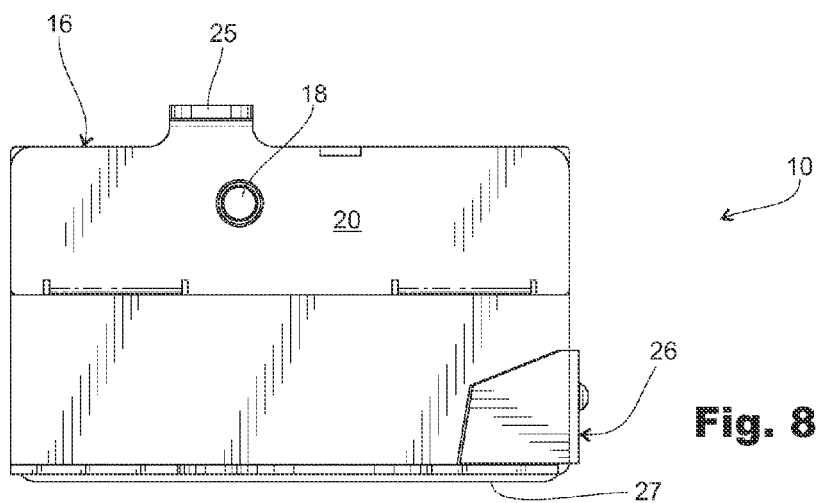
FIG. 8 is a top view of the security bracket assembly.

The security bracket assembly 10 also has a removable forward or frontal bracket portion component 26. Referring now to FIG. 7, for example, the forward bracket component 26 has frontal surface 27 with a curved portion 28 that follows the circumference of a camera lens. A side shield 30 of front bracket component 26 prevents finger access to the camera lens underneath.

Figure 5:
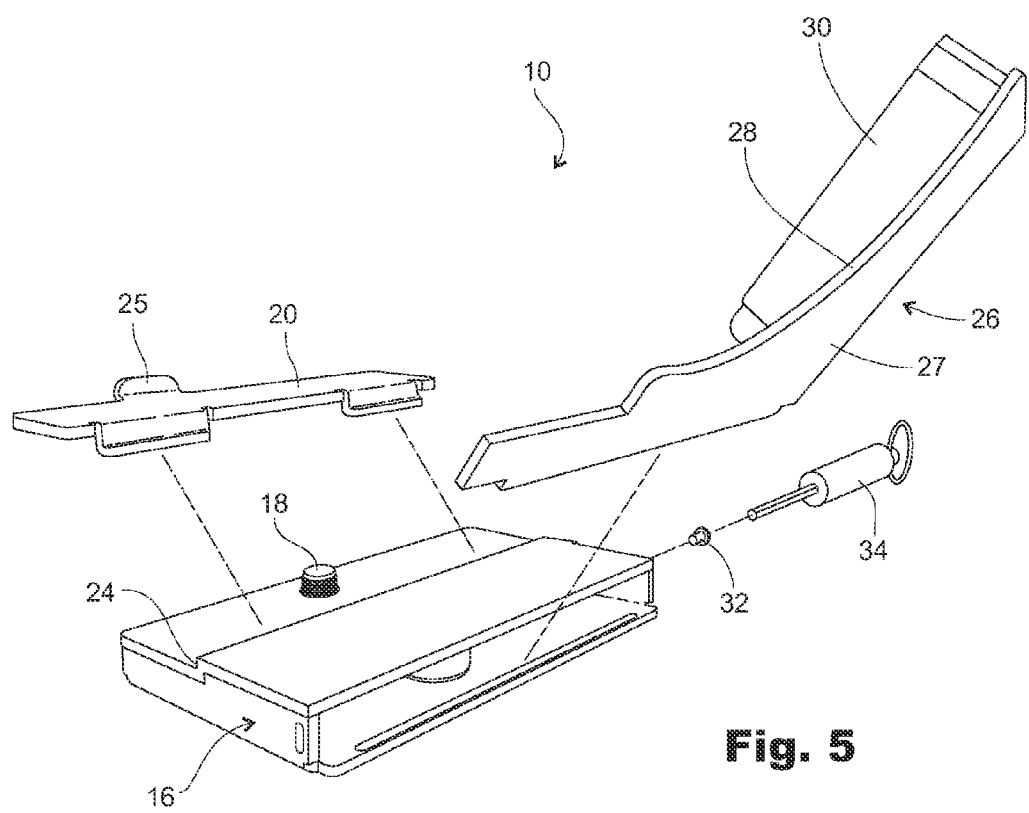
FIG. 5 is an exploded view of the security bracket assembly.

The front bracket component 26 is removable from the base 16 by a screw 32 (see FIG. 5). The screw 32 is removed via a special tool 34. As indicated above, a salesperson may remove the screw, which permits the forward bracket component 26 to be removed from the overall security bracket assembly 10, as indicated in the exploded view of FIG. 5. This allows camera lenses to be swapped to and from the display without disconnecting or unmounting the camera body itself.

As indicated in FIG. 4, the security bracket assembly 10 may capture and partially surround the typical camera body and lens configuration. One way of using the security bracket assembly 10 described here involves first attaching the assembly 10 to a camera and then mounting the bracket and camera together on a post (i.e. on the puck) on a countertop display.

The forward-looking or frontal surface 27 of the removable forward bracket component or part 26 is a certain distance from the front of the camera body (see item 36 in FIG. 3). The width of the side shield 30 is selected accordingly so as to shield finger access to the interface between camera lens 38 and camera body 40. The region where the lens release mechanism is generally located is indicated at 42. However, as a skilled person would understand, different camera models have variations in the types of release mechanisms used.

Referring again to FIG. 6, the rearward retaining tab 25 is part of the adaptor piece 20. The adaptor piece 20 can be custom-measured to fit the different bodies of various kinds of camera models. The retaining tab 25 is bent up in order to prevent the camera body from rotating relative to the base portion 16 of the security bracket assembly 10.

Figure 9:
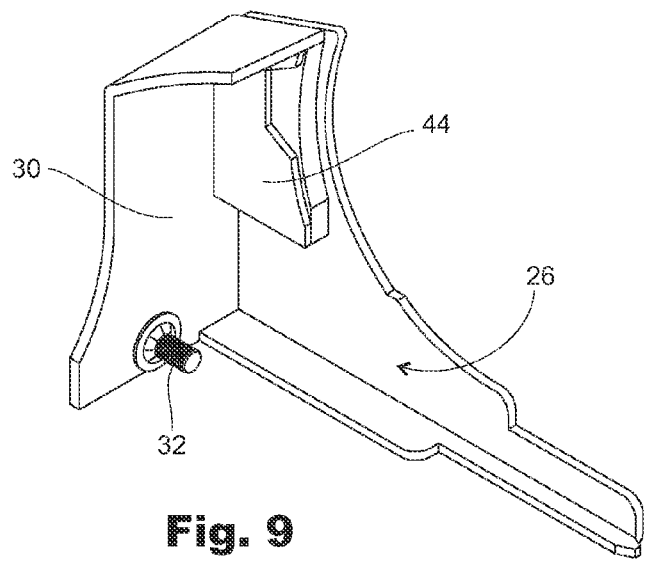
FIG. 9 is a rear view of a removable forward or frontal portion of the security bracket assembly.

FIG. 9 provides a rearward-looking view of the forward bracket component 26. As described above, the side shield 30 prevents finger access to the camera lens on the inside of the shield. Because one forward bracket 26 can be swapped with another, the bracket can be customized with additional protective structure 44 that adapts the forward bracket component 26 to the shape of buttons or different release mechanism configurations on the camera lens, as needed.

Figure 6:
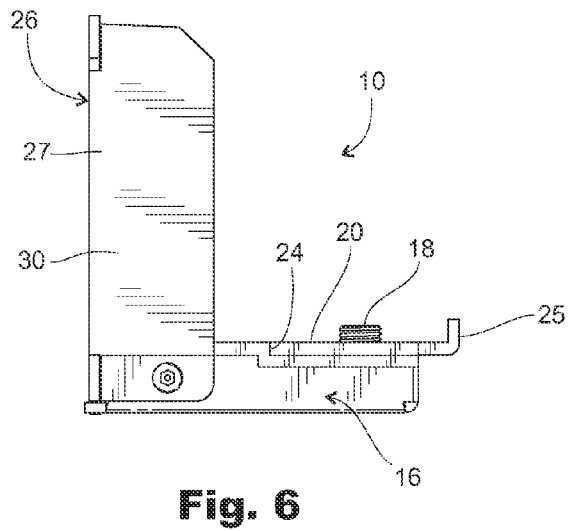
FIG. 6 is an end view of the security bracket assembly.
Figure 10:
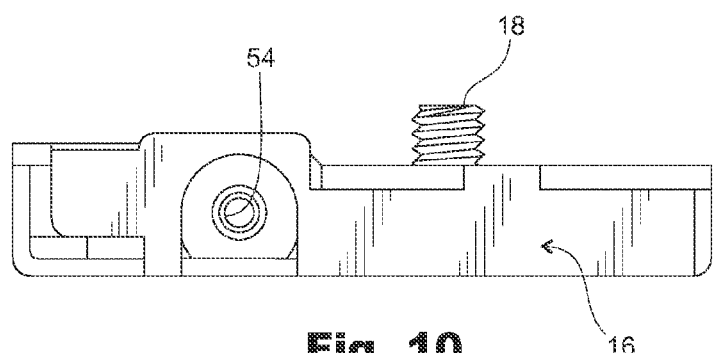
FIG. 10 is a side view of a rectangular base portion of the security bracket assembly.
Figure 11:
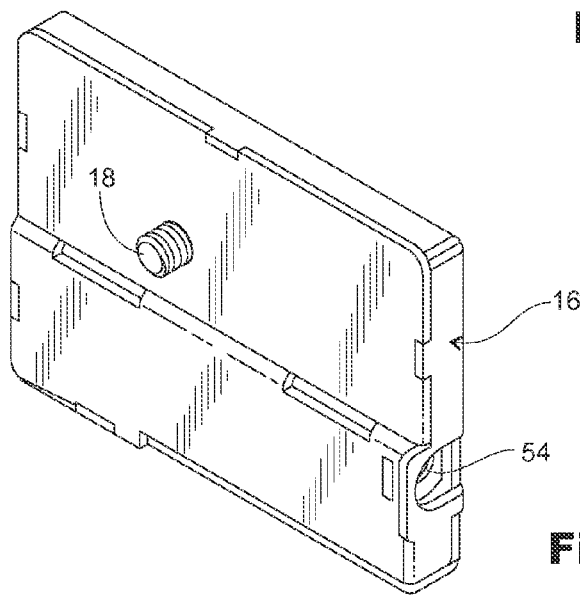
FIG. 11 is a pictorial view of the top-side of the base portion shown in FIG. 10.
Figure 12:
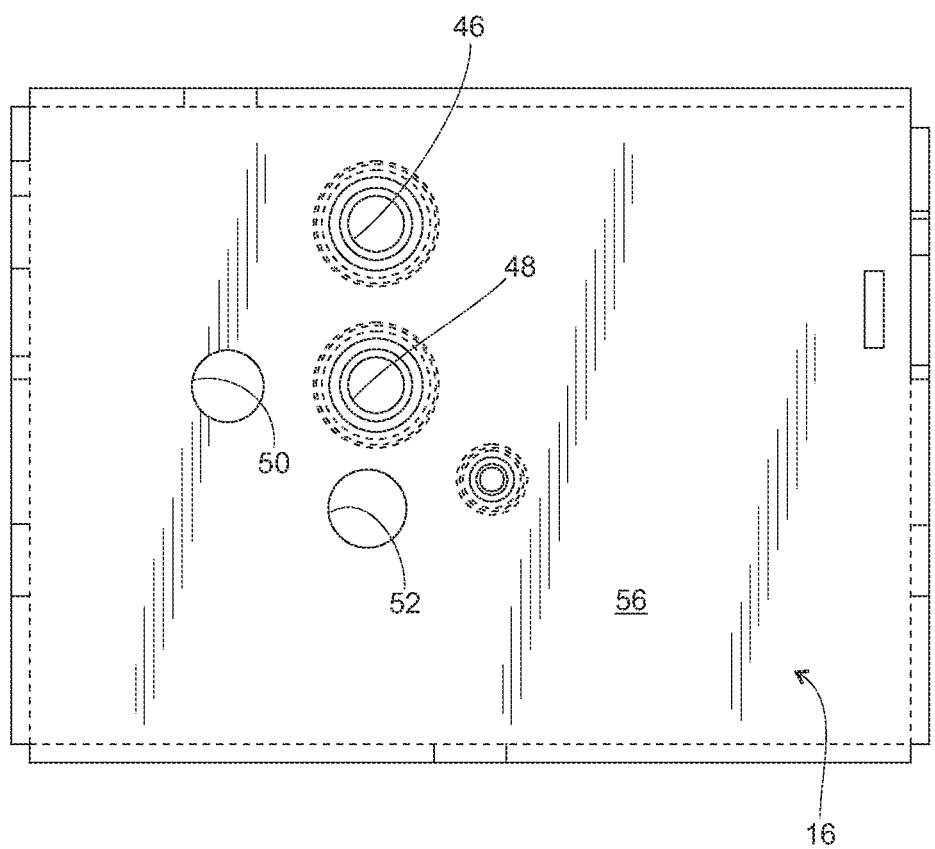
FIG. 12 is a bottom view of the base portion shown in FIGS. 10 and 11.

FIG. 10 is a view similar to FIG. 6, but shows the adaptor piece 20 (and retaining tab 25) removed from the base. FIG. 11 is a pictorial view of FIG. 10. Directing attention now to FIG. 12, the underside of base portion 16 may be provided with multiple numbers of threaded inserts 46, 48 for enabling the best placement of the security bracket assembly 10 on a display post puck. The base portion 16 may also have different anti-rotation port holes 50, 52 for preventing the base portion 16 (and entire assembly 10) from being rotated off the puck. FIGS. 9 and 10 illustrate where the forward bracket screw 32 threads into a fitting 54 in the side of the base portion 16.

Finally, referring again to FIG. 1, it is to be appreciated that the entire security bracket assembly 10 is detachably mountable to the mounting member or puck 12. As a person skilled in the art would know, the puck 12 typically has a screw that is adapted to be threaded into one or the other threaded ports 46, 48 illustrated on the underside surface 56 of base portion 16. The removable forward part 26 is preferably molded and has a horizontal section 58 that fits against the underside 56 of base portion 16. The side shield 30 is molded as a section of the same part. In use, one removable forward part 26 may be selected from a group and used, as needed, for the specific camera model that is to be lifted by the puck 12.

The foregoing description is not meant to limit the spirit and scope of the invention. Instead, the scope of the patent right is to be limited only by the subjoined claim or claims as follow, the interpretation of which is to be made in accordance with conventional doctrines of patent claim interpretation.

What is claimed is:

1. A security bracket for use on a mounting member for displaying a camera in a retail location, the camera being characterized in that it has a removable lens and a release mechanism for removing the lens from the camera, the improvement comprising:
    a security bracket assembly detachably mountable to said mounting member, said security bracket assembly having a base portion shaped to at least partially receive a camera body;
    a frontal portion shaped to at least cover said camera release mechanism to prevent physical access to the release mechanism when the security bracket assembly is mounted to the mounting member;

means for detaching said frontal portion from said base portion so that the frontal portion can removed from said base portion without removing the camera from the mounting member; and wherein said means for detaching said frontal portion includes a threaded coupling member carried by said frontal portion that is adapted to engage with a threaded fitting in said base portion.

2. A security bracket for use on a mounting member for displaying a camera in a retail location, the camera being characterized in that it has a removable lens and a release mechanism for removing the lens from the camera, the security bracket comprising:

a security bracket assembly detachably mountable to said mounting member, said security bracket assembly having a base portion shaped to at least partially receive a camera body;

a frontal portion shaped to at least cover said camera release mechanism to prevent physical access to the release mechanism when the security bracket assembly is mounted to the mounting member, wherein said frontal portion includes a forward curved face, a horizontal member that fits against an underside of said base portion, and a side shield for covering a region on said camera where said release mechanism is located; and means for detaching said frontal portion from said base portion so that the frontal portion can removed from said base portion without removing the camera from the mounting member.

\* \* \* \* \*